United States Patent
Suga et al.

(10) Patent No.: US 10,611,382 B2
(45) Date of Patent: Apr. 7, 2020

(54) METHODS AND SYSTEMS FOR GENERATING ADAPTIVE INSTRUCTIONS

(71) Applicant: HONDA MOTOR CO., LTD., Minato-ku, Tokyo (JP)

(72) Inventors: Chihiro Suga, Raymond, OH (US); Teruhisa Misu, Mountain View, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 89 days.

(21) Appl. No.: 16/005,357

(22) Filed: Jun. 11, 2018

(65) Prior Publication Data
US 2019/0375426 A1 Dec. 12, 2019

(51) Int. Cl.
*B60W 50/08* (2020.01)
*B60W 40/08* (2012.01)
*G06N 20/00* (2019.01)
*B60W 50/00* (2006.01)

(52) U.S. Cl.
CPC ............ *B60W 50/08* (2013.01); *B60W 40/08* (2013.01); *G06N 20/00* (2019.01); *B60W 2050/0065* (2013.01); *B60W 2050/0088* (2013.01)

(58) Field of Classification Search
CPC .............. B60W 50/08; B60W 40/08; B60W 2050/0088; B60W 2050/0065; G06N 20/00
See application file for complete search history.

(56) References Cited

U.S. PATENT DOCUMENTS

| | | | |
|---|---|---|---|
| 9,162,622 B2 | 10/2015 | Szczerba et al. | |
| 9,354,073 B2 | 5/2016 | Censo et al. | |
| 2003/0028451 A1* | 2/2003 | Ananian | G06Q 30/02 705/26.42 |
| 2010/0017733 A1* | 1/2010 | Barros | G06F 3/04847 715/766 |
| 2013/0226758 A1* | 8/2013 | Reitan | G06Q 40/00 705/35 |
| 2013/0232430 A1* | 9/2013 | Reitan | G06F 3/0484 715/765 |
| 2013/0235079 A1* | 9/2013 | Reitan | G06F 3/011 345/633 |

(Continued)

OTHER PUBLICATIONS

Alberto Fernandez et al., "Driver Distraction Using Visual-Based Sensors and Algorithms" Sensors, 16, 1805, 2016.

(Continued)

*Primary Examiner* — Russell Frejd
(74) *Attorney, Agent, or Firm* — Arent Fox, LLP (57) ABSTRACT

Systems and methods for generating adaptive instructions for a driver. The system includes a memory that stores instructions for generating adaptive instructions for a driver. The system also includes a processor configured to execute the instructions. The instructions cause the processor to: monitor one or more factors including a gaze of the driver, a physiological signal of the driver, information related to the operation of a vehicle, and information related to an external environment of the vehicle; analyze the one or more factors to determine when and how to provide the adaptive instructions to the driver; generate the adaptive instructions based on the analysis; and provide the adaptive instructions to the driver via a vehicle user interface.

20 Claims, 4 Drawing Sheets

(56) References Cited

U.S. PATENT DOCUMENTS

| | | | | |
|---|---|---|---|---|
| 2013/0238778 A1* | 9/2013 | Reitan | ............... | H04L 41/00 709/223 |
| 2013/0249948 A1* | 9/2013 | Reitan | ............... | G06F 3/011 345/633 |
| 2013/0335407 A1* | 12/2013 | Reitan | ............... | G06F 3/011 345/419 |
| 2015/0310287 A1 | 10/2015 | Tseng et al. | | |
| 2017/0075701 A1* | 3/2017 | Ricci | ............... | H04W 4/21 |

OTHER PUBLICATIONS

Rizwan Ali Naqvi et al., "Deep Learning-Based Gaze Detection System for Automobile Drivers Using a NIR Camera Sensor", Sensors, 18, 456, 2018.

SeungJun Kim et al., "Route Guidance Modality for Elder Driver Navigation" Pervasive, LNCS 7319, pp. 179-196, 2012.

W.M. Campbell et al., "Machine Learning for Advising a Driver: A Survey", ICMLA, pp. 219-225, 2002.

\* cited by examiner

METHODS AND SYSTEMS FOR GENERATING ADAPTIVE INSTRUCTIONS

TECHNICAL FIELD

The present disclosure generally relates to methods and systems for generating adaptive instructions.

BACKGROUND

One possible use of navigation systems is to provide driving instructions to vehicle operators. Navigation systems may generally use a location device to acquire position data of a vehicle, and then correlate it to a position on a mapped road. The navigation systems may be used to provide suggested directions to an operator of a vehicle via text or voice. However, the suggested directions may be uniform to all drivers, based on various parameters such as shortest route, fastest route, etc., regardless of the operating environment. That is, the suggested directions may not take into account the mental state of the driver (e.g., whether the driver is distracted/confused), the environment surrounding the vehicle, and/or the operating state of the vehicle.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure relates to a system that includes a memory that stores instructions for executing processes that may generate adaptive instructions for a driver. The system may also include a processor configured to execute the instructions. The instructions may cause the processor to: monitor one or more factors including a gaze of the driver, a physiological signal of the driver, information related to the operation of a vehicle, and information related to an external environment of the vehicle; analyze the one or more factors to determine when and how to provide the adaptive instructions to the driver; generate the adaptive instructions based on the analysis; and provide the adaptive instructions via a vehicle user interface.

In a further aspect, the present disclosure relates to a method for generating adaptive instructions for a driver. The method may include: monitoring one or more factors including a gaze of the driver, a physiological signal of the driver, information related to the operation of a vehicle, and information related to an external environment of the vehicle; analyzing the one or more factors to determine when and how to provide the adaptive instructions to the driver; generating the adaptive instructions based on the analysis; and providing the adaptive instructions via a vehicle user interface.

In a further aspect, the present disclosure relates to a non-transitory computer-readable storage medium containing executable computer program code. The code comprises instructions that may cause a processor to: monitor one or more factors including a gaze of the driver, a physiological signal of the driver, information related to the operation of a vehicle, and information related to an external environment of the vehicle; analyze the one or more factors to determine when and how to provide the adaptive instructions to the driver; generate the adaptive instructions based on the analysis; and provide the adaptive instructions via a vehicle user interface.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected," is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
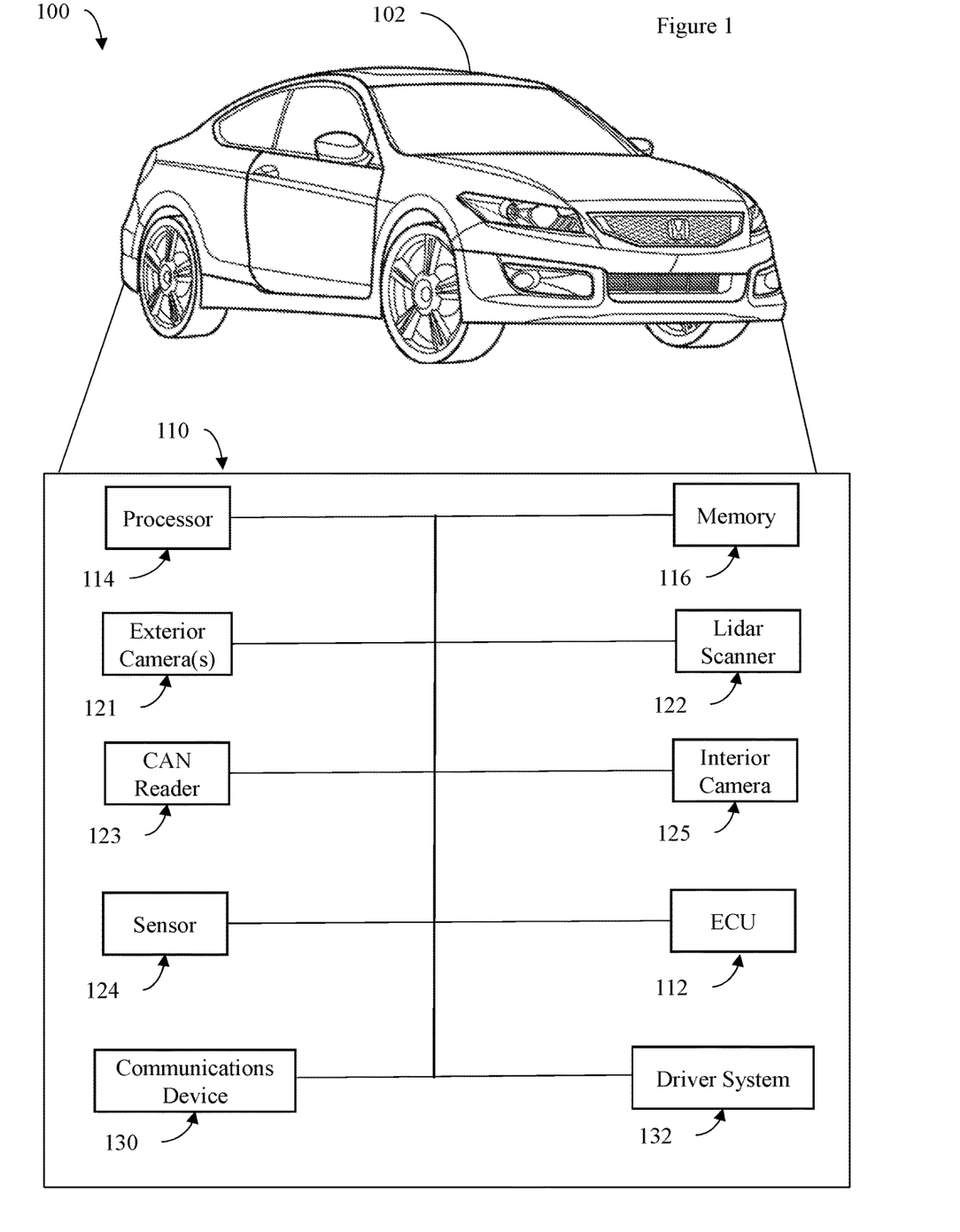
FIG. 1 illustrates a schematic view of an exemplary operating environment of a vehicle system in accordance with aspects of the present disclosure.

Generally described, the present disclosure provides systems and methods for generating adaptive instructions in accordance with aspects of the present disclosure. Turning to FIG. 1, a schematic view of an exemplary operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle system 110 may generally include an electronic control unit (ECU) 112 that operably controls a plurality of vehicle systems. The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110. The vehicle systems may include, but are not limited to, the vehicle system 110, among others, including vehicle HVAC systems, vehicle audio systems, vehicle video systems, vehicle infotainment systems (such as a heads-up display (HUD) or center display), vehicle telephone systems, and the like. One or more of these systems may interchangeably be referred to herein as a vehicle user interface.

The vehicle system 110 may include a plurality of multi-modal sensors including, but not limited to, one or more exterior cameras 121, a Lidar laser scanner 122, and a vehicle controller area network (CAN) reader 123. In some aspects, the one or more exterior cameras 121 and/or the Lidar laser scanner 122 may provide images of the environment surrounding the vehicle 102 and/or detect one or more objects in the environment surrounding the vehicle 102. In further aspects, the CAN reader 123 may provide data related to operation of the vehicle 102. For example, the CAN reader 123 may provide vehicle information including, but not limited to, speed, braking, throttle, steering, yaw rate, and velocity, among other information. In some aspects, each of the signals from the plurality of multi-modal sensors may be synchronized to a common system clock.

The multi-modal sensors may also include an interior camera 125 and/or a sensor 124. In some aspects, the interior camera 125 may be used for tracking a gaze of a driver of the vehicle 102. In some aspects, the sensor 124 may be attached to the driver, such as via a chestband and/or a wristband worn by the driver, and/or the sensor 124 may be a sensor embedded within the vehicle 102 to monitor brainwave activity of the driver of the vehicle 102. In this way, the sensor 124 may collect data regarding physiological signals of the driver, such as a heartrate, a breathing rate, and brainwave activity, among other data. Thus, in some aspects, the plurality of multi-modal sensors may provide images of the environment surrounding the vehicle 102, detect one or more objects in the environment surrounding the vehicle 102, provide data related to operation of the vehicle 102, provide images of the driver within the vehicle 102, and/or provide physiological information of the driver to a driver system 132.

Figure 2:
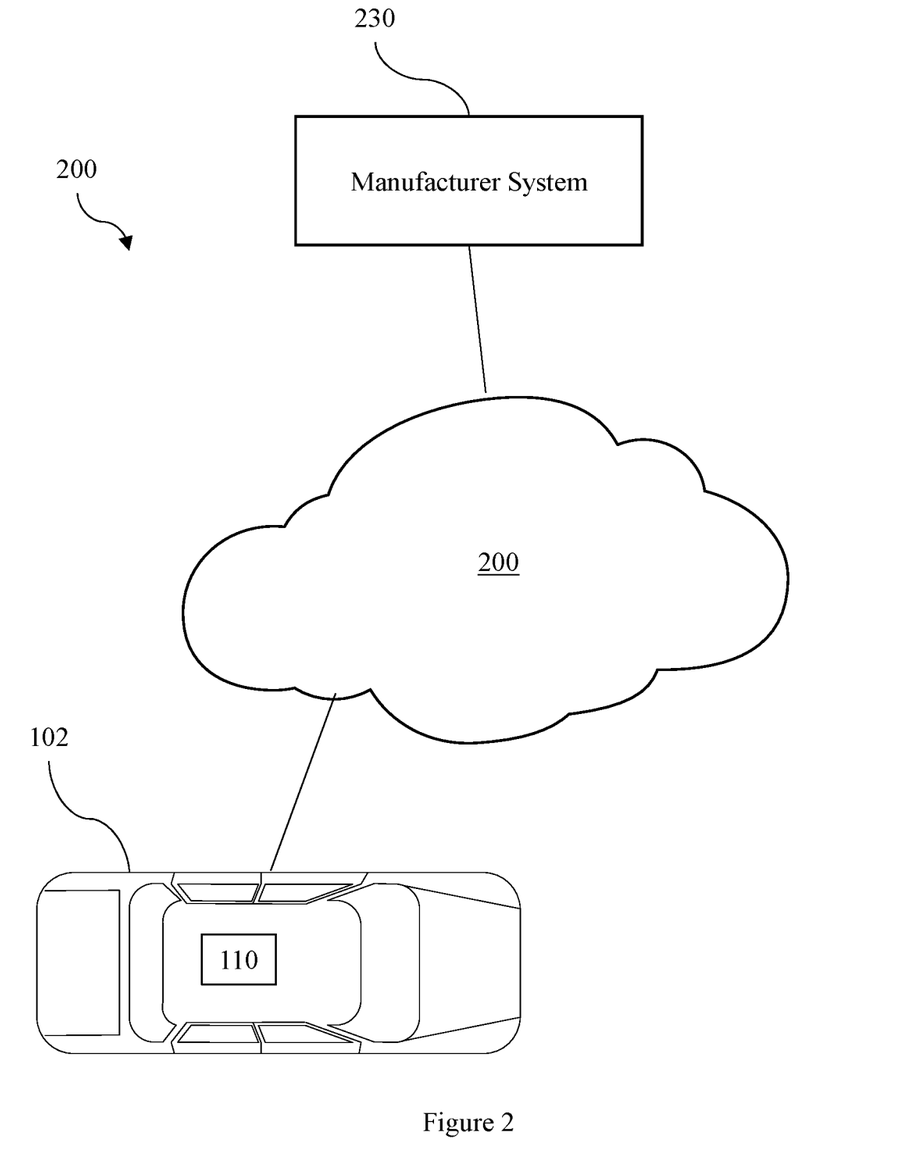
FIG. 2 illustrates an exemplary network for managing the vehicle system in accordance with aspects of the present disclosure.

The vehicle system 110 may also include a processor 114 and a memory 116 that communicate with a communications device 130 and the driver system 132. The communications device 130 (e.g., wireless modem) may provide wired or wireless computer communications utilizing various protocols to send/receive electronic signals internally with respect to features and systems within the vehicle 102 and with respect to external devices. For example, the communications device 130 may wirelessly communicate with a manufacturer system, as illustrated in FIG. 2. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®.

In some aspects, the driver system 132 may include a trained model for determining when (e.g., a timing) and how (e.g., a best mode) to provide instructions, such as navigational instructions, to the driver. The best mode for providing the instructions may include providing the instructions on a heads-up display (HUD), via a voice command (e.g., speech), on a center display, and/or via haptic feedback, e.g., haptic steering feedback. It should be understood by those of ordinary skill in the art that these are merely example modalities of providing instructions to the driver, and that other modalities are further contemplated in accordance with aspects of the present disclosure. In further aspects, the trained model may be trained using a machine learning algorithm, such as a decision tree algorithm or a random forest learning algorithm, based on training driving scenarios. In some instances, the trained model may be trained to identify correlations between the driver's physiological signals and/or gaze, the environment surrounding the vehicle 102, and/or data related to operation of the vehicle 102 based on the training driving scenarios. As a result, the trained model may be used by the driver system 132 to determine when and how to provide the instructions based on these correlations. In some aspects, the trained model may also be trained to determine whether the driver is distracted and/or confused based on eye movement patterns, facial expressions, and/or the physiological signals of the driver.

In some aspects, an example training driving scenario may include a situation where the driver's gaze is directed away from the HUD or center display, e.g., at an object outside the vehicle 102, and the trained model may be trained to provide the instructions to the driver via voice commands and/or haptic feedback. In this way, the driver may be alerted to instructions that the driver would otherwise be unable to see if they were only displayed on the HUD or center display. As another example, when the driver's gaze is directed to the HUD or center display, the trained model may be trained to provide the instructions to the driver via any of the HUD, voice command, center display, and/or haptic feedback. In a further example, if the driver is confused and/or distracted by interactions with other passengers in the vehicle 102 or by the environment surrounding the vehicle 102, the driver system 132 may be trained to provide the instructions via the HUD and/or the center display. As a result, the driver may visually focus on the instructions. In yet another example, if the vehicle 102 is approaching a nearby object and/or intersection at a high speed, the driver system 132 may be trained to provide the instructions to the driver via voice commands and/or haptic feedback, such that the driver may be made aware of the instructions immediately. It should be understood by those of ordinary skill in art that these are merely example training driving scenarios on which the trained model may be trained, and that other training driving scenarios are further contemplated in accordance with aspects of the present disclosure.

In further aspects, the trained model may be trained identify when and how to provide the instructions for each driver of the vehicle 102. For example, each driver may be associated with a given key fob, and in some aspects, the vehicle system 110 may identify a specific driver based on the key fob used to unlock/start the vehicle. In this way, the driver system 132 may identify which driver is currently operating the vehicle 102 and tailor the instructions to the specific driver accordingly. Using the example above, when the driver's gaze is directed away from the HUD or center display, the trained model of the driver system 132 may be trained for the specific driving style or habits of each specific driver. For example, if the specific driver reacts more positively to the instructions (e.g., the driver is less distracted by or responds more quickly to the instructions) via voice commands, rather than haptic feedback (or vice-versa), the driver system 132 may provide the instructions to the driver accordingly. In this way, the trained model may be trained provide instructions that are most effective for the specific driver of the vehicle 102.

By using the machine learning algorithms, the trained model of the driver system 132 may continuously be trained to determine when and how to provide instructions to the driver. That is, the trained model may recognize which instructions are most effective for the driver of the vehicle 102 over time. This enhanced recognition may enable the driver system 132 to tailor when and how to provide the instructions to each specific driver.

Additionally, in some aspects, the driver system 132 may monitor the driver's reactions, gaze, and physiological signals based on the data captured by the interior camera 125 and/or sensor 124, information related to the operation of the vehicle 102 detected by the CAN reader 123, and external scene data collected by the one or more exterior cameras 121. Using this information, the driver system 132 may determine when to provide instructions to the driver and the best mode for providing such instructions based on the trained model. After the driver system 132 determines when and how to provide the instructions, the driver system 132 may also generate the instructions, such that the instructions may be provided to the driver via the vehicle user interface. For example, the adaptive instructions may be provided to the driver using one or more of the vehicle user interface systems, such as the vehicle audio systems, vehicle video systems, vehicle infotainment systems (such as a heads-up display (HUD) or center display), vehicle telephone systems, and the like.

FIG. 2 illustrates an exemplary network 200 for managing the vehicle system 110. The network 200 may be a communications network that facilitates communications between multiple systems. For example, the network 200 may include the Internet or another Internet Protocol (IP) based network. The network 200 may enable the vehicle system 110 to communicate with a manufacturer system 230. The manufacturer system 230 and the driver system 132 may include a computer system, as shown with respect to FIG. 3 described below. For example, the manufacturer system 230 may also include a memory that stores instructions for executing processes for generating adaptive instructions, and a processor configured to execute the instructions.

For example, in some aspects, the vehicle 102 may transmit the data collected from the multi-modal sensors to the manufacturer system 230, which may be housed, e.g., on one or more servers, and the trained model may reside on the manufacturer system 230. In this way, the manufacturer system 230 may be trained to generate adaptive instructions in a similar manner as described with respect to the vehicle 102, and the manufacturer system 230 may generate instructions for generating adaptive instructions. Additionally, in some aspects, the manufacturer system 230 may distribute the instructions for generating adaptive instructions to a plurality of vehicles 102 over the network 200.

Figure 3:
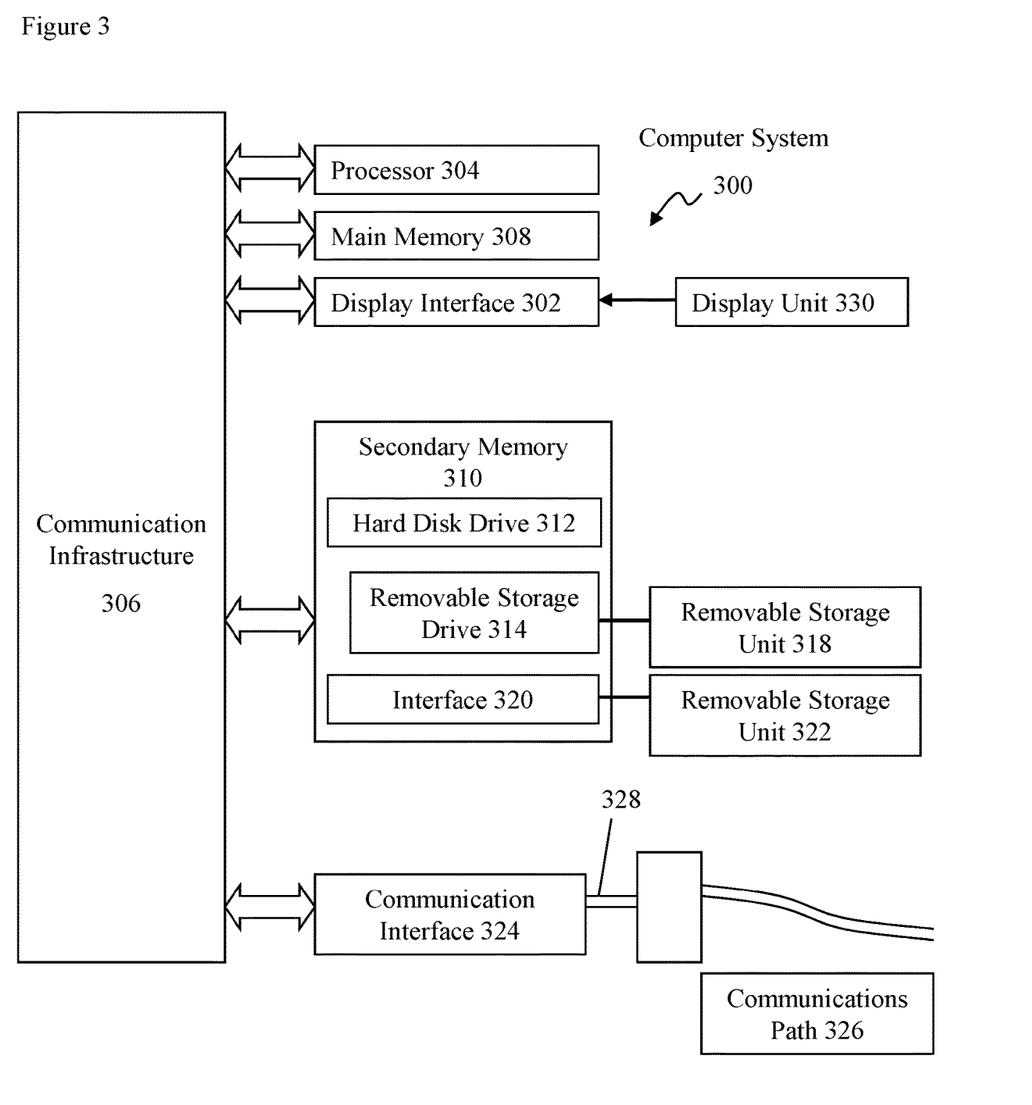
FIG. 3 illustrates various features of an exemplary computer system for use in conjunction with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
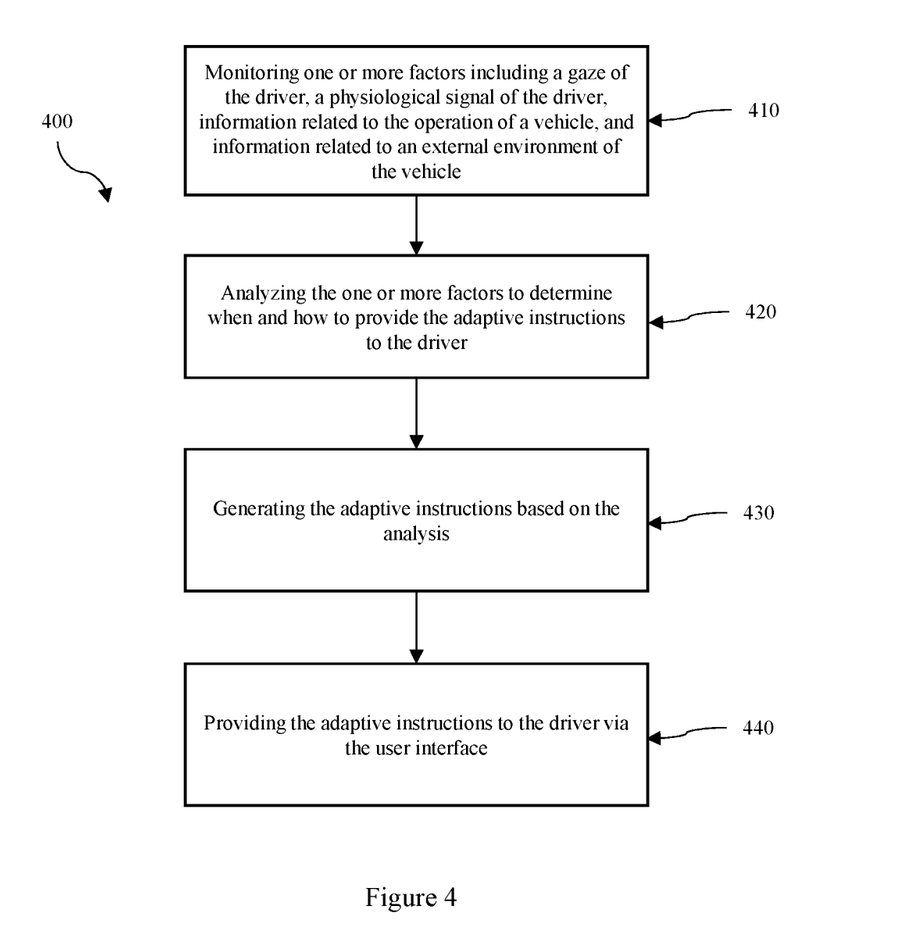
FIG. 4 illustrates an exemplary flowchart for generating adaptive navigation notifications in accordance with aspects of the present disclosure.

FIG. 4 illustrates a flowchart for generating adaptive instructions for a driver. In some aspects, the method may include monitoring one or more factors including a gaze of the driver, a physiological signal of the driver, information related to the operation of a vehicle, and information related to an external environment of the vehicle 410. For example, the gaze of the driver may be monitored using information from the interior camera 125, the driver's physiological signals may be monitored using information from the sensor 124, the information related to the operation of a vehicle may be monitored using information from the CAN reader 123, and the information related to an external environment of the vehicle may be monitored using information from the one or more exterior cameras 121.

The method may also include analyzing the one or more factors to determine when and how to provide the adaptive instructions to the driver 420. In some aspects, this may be achieved using a model trained based on driving scenarios using a machine learning algorithm, such as a decision tree algorithm or a random forest learning algorithm. In some aspects, the model may be trained to identify correlations between the factors, and to determine when and how to provide the adaptive instructions is based on the correlations. In further aspects, the model may be trained to tailor the adaptive instructions for each respective driver of the vehicle. For example, each respective driver may be associated with a given key fob, and model may be trained to provide adaptive instructions for each specific driver based on the associated key fob used to start the vehicle.

The method may also include generating the adaptive instructions based on the analysis 430. In this way, the method may further include providing the adaptive instructions to the driver via the user interface 440. For example, the adaptive instructions may be provided to the driver using one or more of the vehicle user interface systems, such as the vehicle audio systems, vehicle video systems, vehicle infotainment systems (such as a heads-up display (HUD) or center display), vehicle telephone systems, and the like.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
a memory that stores instructions for generating adaptive instructions for a driver; and
a processor configured to execute the instructions, wherein the instructions cause the processor to:
monitor one or more factors including a gaze of the driver, a physiological signal of the driver, information related to the operation of a vehicle, and information related to an external environment of the vehicle;
analyze the one or more factors to select a best mode to provide the adaptive instructions to the driver;
generate the adaptive instructions based on the analysis; and
provide the adaptive instructions via the best mode to the driver via a vehicle user interface.

2. The system of claim 1, wherein the best mode for providing the adaptive instructions being one or more of the following: a heads-up display (HUD), a voice command, a center display, and haptic feedback.

3. The system of claim 1, wherein the analyzing is based on a model trained on driving scenarios.

4. The system of claim 3, wherein the model is trained using a machine learning algorithm including a decision tree algorithm or a random forest learning algorithm.

5. The system of claim 3, wherein the model is trained to identify correlations between the one or more factors, and to determine when and how to provide the adaptive instructions is based on the correlations.

6. The system of claim 3, wherein the model is trained to tailor the adaptive instructions for each specific driver of the vehicle.

7. The system of claim 6, wherein each specific driver is associated with a given key fob, and the processor is further configured to identify a specific driver based on the associated key fob.

8. A method for generating adaptive instructions for a driver comprising:
monitor one or more factors including a gaze of the driver, a physiological signal of the driver, information related to the operation of a vehicle, and information related to an external environment of the vehicle;
analyzing the one or more factors to select a best mode to provide the adaptive instructions to the driver;
generating the adaptive instructions based on the analysis; and
providing the adaptive instructions via the best mode to the driver via a vehicle user interface.

9. The method of claim 8, wherein the best mode for providing the adaptive instructions being one or more of the following: a heads-up display (HUD), a voice command, a center display, and haptic feedback.

10. The method of claim 8, wherein the analyzing is based on a model trained on driving scenarios.

11. The method of claim 10, wherein the model is trained using a machine learning algorithm including a decision tree algorithm or a random forest learning algorithm.

12. The method of claim 10, wherein the model is trained to identify correlations between the one or more factors, and the determining when and how to provide the adaptive instructions is based on the correlations.

13. The method of claim 10, wherein the model is trained to tailor the adaptive instructions for each specific driver of the vehicle.

14. The method of claim 10, wherein each specific driver is associated with a given key fob, and the method further comprises identifying a specific driver based on the associated key fob.

15. A non-transitory computer-readable storage medium containing executable computer program code, the code comprising instructions configured to cause a processor to:
monitor one or more factors including a gaze of the driver, a physiological signal of the driver, information related to the operation of a vehicle, and information related to an external environment of the vehicle;
analyze the one or more factors to select a best mode to provide the adaptive instructions to the driver;
generate the adaptive instructions based on the analysis; and
provide the adaptive instructions via the best mode to the driver via a vehicle user interface.

16. The medium of claim 15, wherein the best mode for providing the adaptive instructions being one or more of the following: a heads-up display (HUD), a voice command, a center display, and haptic feedback.

17. The medium of claim 15, wherein the analyzing is based on a model trained on driving scenarios.

18. The medium of claim 17, wherein the model is trained using a machine learning algorithm including a decision tree algorithm or a random forest learning algorithm.

19. The medium of claim 17, wherein the model is trained to identify correlations between the one or more factors, and to determine when and how to provide the adaptive instructions is based on the correlations.

20. The medium of claim 17, wherein the model is trained to tailor the adaptive instructions for each specific driver of the vehicle with each specific driver being associated with a given key fob, and the code further comprises instructions configured to cause the processor to identify a specific driver based on the associated key fob.

* * * * *